Oct. 22, 1940.   C. CORONELLO   2,219,252
SAFETY BALANCE TWIN BOATS
Filed Dec. 12, 1938   2 Sheets-Sheet 1

INVENTOR
Charles Coronello
BY
ATTORNEY

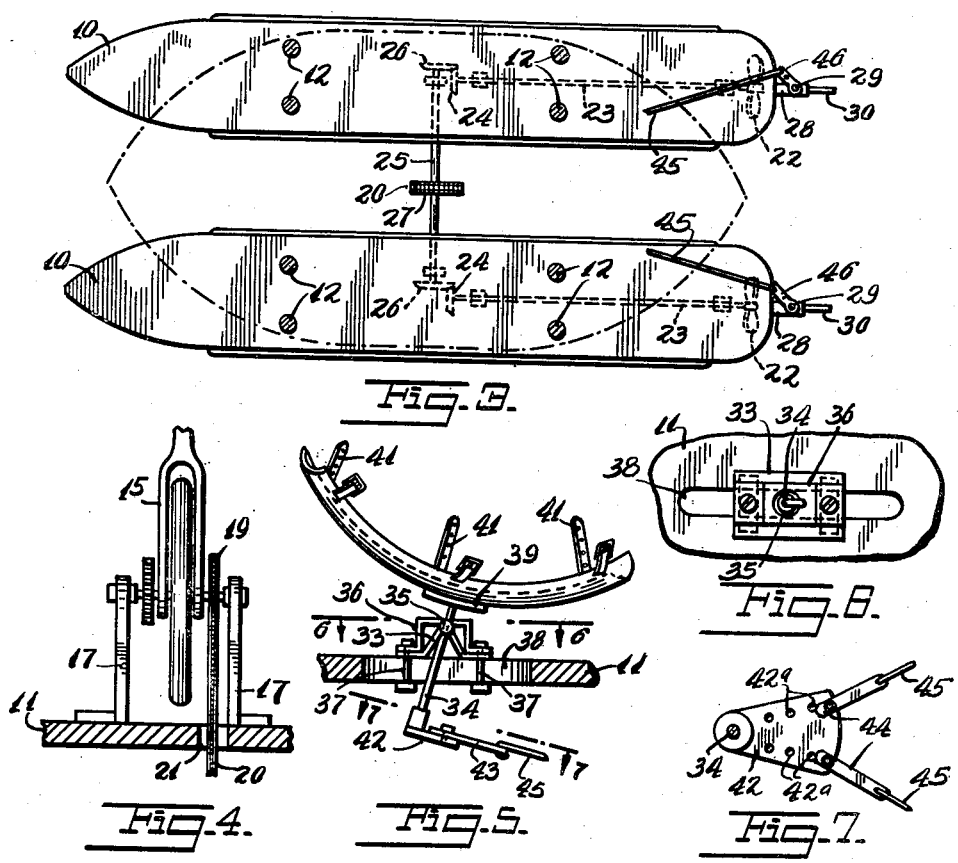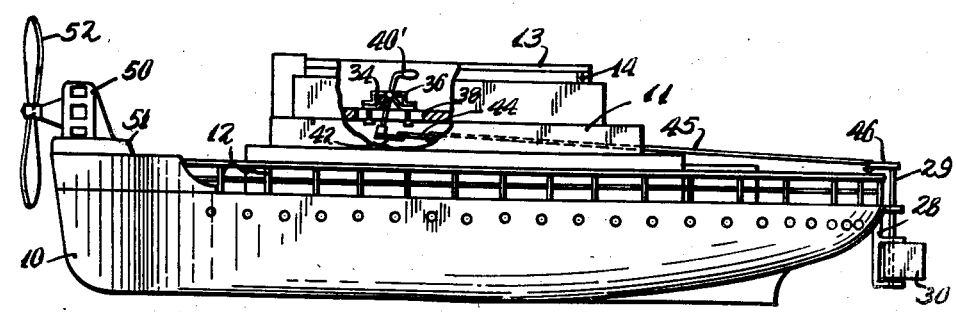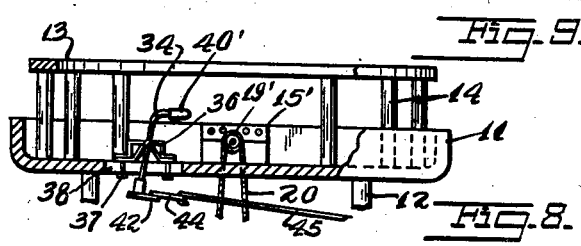

Patented Oct. 22, 1940

2,219,252

UNITED STATES PATENT OFFICE 2,219,252

SAFETY BALANCE TWIN BOATS

Charles Coronello, New York, N. Y.

Application December 12, 1938, Serial No. 245,114

1 Claim. (Cl. 115—27)

This invention relates to new and useful improvements in a safety balance twin boat.

The invention has for an object the construction of a safety balance twin boat characterized by a pair of parallel boat shaped floats having a platform disposed therebetween and connected therewith in a particular manner for causing said floats to be connected together to move as a twin boat unit.

Still further the invention proposes a novel means for supporting a bicycle upon the platform in a particular manner to permit the pedals thereof to be utilized for driving the propellers of said floats for causing said twin boat to move through the water.

Still further the invention proposes that the bicycle be mounted upon the platform in a particular manner to permit the steering mechanism thereof to be connected with the rudders of the floats in a particular manner to permit the steering mechanism to be used for operating the rudders for controlling the movement of the boat within the water.

Still further the invention proposes the provision of a motor adapted to be associated with the propellers in a particular manner for driving the same to cause the boat to be moved through the water.

Another object of this invention is the provision of an airplane motor mounted on the front end of the floats to be used for driving the boat through the water.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure—

Fig. 3 is a horizontal sectional view on the line 3—3 of Fig. 2.

Fig. 4 is a sectional view on the line 4—4 of Fig. 3.

Fig. 5 is an enlarged detailed view of a portion of Fig. 2.

Fig. 6 is a sectional view on the line 6—6 of Fig. 5.

Fig. 7 is a sectional view on the line 7—7 of Fig. 5.

Fig. 8 is a view similar to a portion of Fig. 2 but illustrating a modification of the invention.

Fig. 9 is a view similar to Fig. 2 but illustrating a still further modification of the invention.

Figure 1:
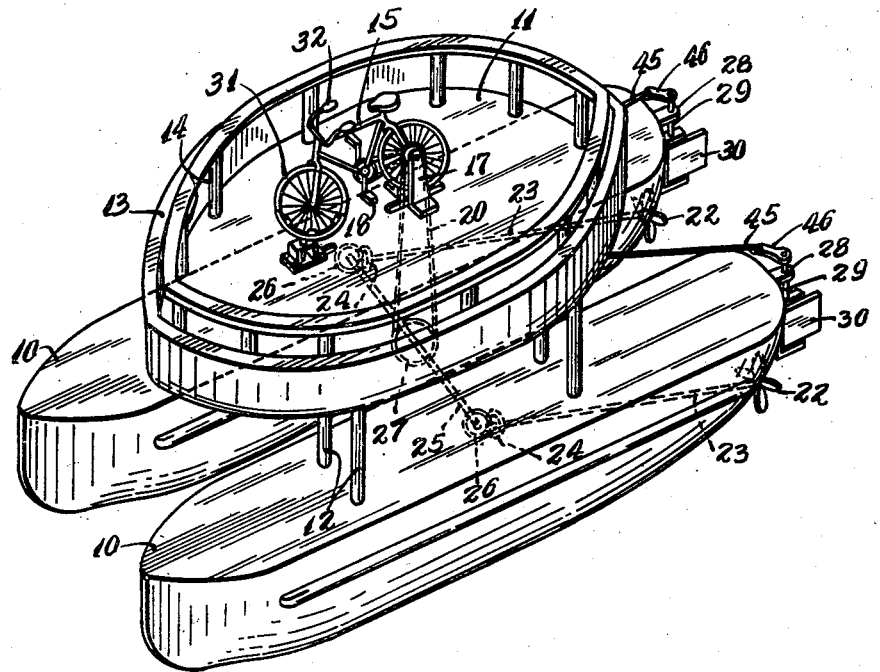
Fig. 1 is a perspective view of the safety balance twin boat constructed according to this invention.
Figure 2:
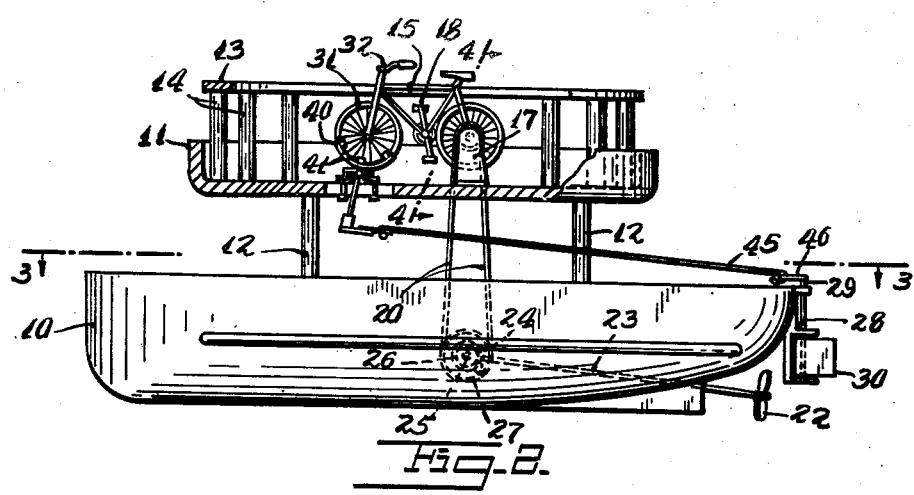
Fig. 2 is an elevational view of Fig. 1 with a portion thereof broken away to reveal interior construction.

The safety balance twin boat, according to this invention, includes a pair of hollow boat shaped floats 10. A platform 11 substantially as wide as the two floats 10 is supported upon a plurality of legs 12 having their bottom ends mounted upon the floats. The platform 11 acts to join the floats together as a unit for causing the floats to move together in unison. The platform 11 is formed with a guard rail 13 which extends completely around the periphery thereof and is supported upon a plurality of brackets 14.

A means is provided for propelling the twin boat and is characterized by a bicycle 15 mounted upon the platform 11. The rear axle 16 of the bicycle 15 is supported between a pair of brackets 17 mounted upon the platform 11 for elevating the rear wheel to permit it to rotate freely when driven by the operation of the pedals 18. The rear axle 16 is provided with a sprocket 19. A chain 20 extends over the sprocket 19 and passes through an opening 21 formed on the platform 11 downwards to a position between the floats 10. Each of the floats 10 is provided with a propeller 22 extending from the back thereof. Each of the propellers 22 is mounted upon one end of a shaft 23, which shafts extend into the hollow of the floats 10. The inner ends of the shafts 23 are provided with gears 24. A shaft 25 is rotatively extended between the floats 10 and into the hollows thereof. The ends of the shaft 25 are provided with gears 26 which mesh with the gears 24. The intermediate portion of the shaft 25 is provided with a sprocket 26 over which the bottom portion of the chain 20 extends for causing the shaft 25 to be rotated when the pedals 18 are turned.

A means is provided for causing the boat to be steered as it moves through the water. The back end of each of the floats 10 is provided with a bracket 28 which rotatively supports a shaft 29 upon which a rudder 30 is mounted. A means is provided for connecting each of the rudders 30 with the front wheel of the bicycle 21 in a manner to permit the handle bars 32 to be turned for steering the boat. A bracket 33 is mounted upon the platform 11 and has a spindle 34 extending therefrom. The spindle 34 is provided with a ball 35 intermediate of its ends which rests against the top end of the bracket 33 for rotatively supporting the spindle 35.

A cap 36 is engageable over the bracket 33 and engages against the top of the ball 35 for holding the same in position upon the bracket 33. The spindle 34 is so mounted upon the bracket 33 as shown in Fig. 5, that it is in end alignment with the fork of the front wheel 31 to permit the front wheel to be easily turned for turning the spindle 34 without causing binding the spindle to limit rotation thereof. The bracket 33 is adjustably supported upon the platform 11 by means of pairs of bolts 37 which pass through an elongated slot 38 formed in the platform 11 for permitting the bracket to be adjusted along the length of the slot 38 to engage the front wheel of bicycles of different lengths, while the rear wheel thereof is supported in the brackets 17.

The upper end of the spindle 34 is provided with a block 39 upon which a cradle 40 is mounted and which is adapted to receive the lower portion of the front wheel 31 of the bicycle 15 as shown in Fig. 1. The cradle is provided with a plurality of straps 41 which are adapted to be engaged around the front wheel 31 for locking the same in position within the cradle for preventing the front wheel from jumping out of the cradle 40. The lower end of the spindle 34 is provided with an arm 42. A plurality of links 43 are adapted to have one of their ends adjustably supported on the arm 42 to compensate for the adjustment of the bracket 33. The adjustable mounting of the links 43 is accomplished by means of bolts 44 which pass through openings formed in one end of the links 43 and which are adapted to be selectively passed through one of a plurality of openings 42ª formed in the arm 42.

Each of the links 43 has one end of a rod 45 connected thereto. The rods 45 extend rearwards of the floats 10 and have their rear ends pivotally attached to arms 46. Each of the arms 46 is mounted on the upper end of one of the rods 28 for causing the rudder 30 to be turned in one direction or the other as controlled by the direction in which the handle bars 32 are rotated.

The operation of this form of the invention is as follows:

A person sits upon the seat of the bicycle 15 and rests his feet upon the pedals 18 and his hands upon the handle bars 32. He then rotates the pedals 18 with his feet causing the rear axle 16 to be rotated, the rotations of which will be transmitted to the propellers mounted upon the floats 10 for causing the floats to be propelled through the water. Since the floats are connected together through the medium of the platform 11 they will move as a unit. For steering the boat the handle bars 32 are turned in the desired direction causing the spindle 34 to be rotated upon the bracket 33 as permitted by the ball 35 to cause the rudders 30 to be turned similarly for steering the boat.

According to the modification of the invention shown in Fig. 8 a gasoline or similar motor 15' is mounted upon the platform 11 and is provided with a sprocket 19' which is mounted upon its drive shaft and over which the chain 20 extends for causing the propellers of the floats to be turned when the motor 15' is operating. The top end of the spindle 34 is provided with a handle 40' in place of the cradle 40 used in the previous form of the invention for permitting the boat to be manually steered.

In other respects this form of the invention is similar to the previous form.

According to the modification of the invention disclosed in Fig. 9 the means for propelling the boat is in the form of an airplane motor 50 mounted upon a bracket 51 extending between the front end of the floats 10. The motor 50 is provided with a propeller 52 which is mounted upon its drive shaft for causing the floats to be moved through the water when the motor 50 is in operation. In other respects this form of the invention is similar to the previous forms.

It is to be understood that the bicycle may be in any form or substituted for a device which simulates an automobile or the like with automobile steering wheels instead of handles 32. The shape and size of the device may be changed as desired.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new and desire to secure by United States Letters Patent is:

In a device of the class described, a vehicle having a propeller mechanism, a platform mounted on said vehicle, a steering mechanism for said vehicle and a rod extending therefrom, a bracket mounted on said platform, said bracket having a socket member thereon, a spindle having a ball thereon turnably mounted in the socket on said bracket for rotation about the longitudinal axis of said spindle and about another axis transverse thereto, a cradle mounted on the upper end of said spindle for receiving the front wheel of a bicycle whereby said wheel may be turned for similarly turning said spindle, an arm mounted on the bottom end of said spindle to turn therewith, means for connecting the free end of said rod to said arm for transmitting movements of said spindle to said steering mechanism, and bolts on said bracket passing through longitudinally extending elongated slots formed in said platform for releasably holding said bracket in position on said platform, whereby said bolts may be loosened and then said bracket shifted to various longitudinal positions on said platform to accommodate any one of a plurality of types of bicycles, said means for connecting said rod to said arm being shiftable to relocate the point of connection and so compensate for changes in position of said spindle with respect to said platform, said means comprising a bolt mounted on the end of said rod and selectively engageable through one of a plurality of complementary openings formed in said arm, means fixed on said platform rearward of said bracket for mounting the rear end of said bicycle, and transmission means connecting the driving mechanism of the bicycle and the propellor mechanism of said vehicle.

CHARLES CORONELLO.